(12) United States Patent
Yang et al.

(10) Patent No.: US 10,734,894 B1
(45) Date of Patent: Aug. 4, 2020

(54) CHARGE PUMP SYSTEM WITH ELECTROMAGNETIC INTERFERENCE MITIGATION

(71) Applicant: Silicon Laboratories Inc., Austin, TX (US)

(72) Inventors: Chao Yang, Austin, TX (US); Mohamed Elsayed, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 16/547,107

(22) Filed: Aug. 21, 2019

(51) Int. Cl.
| | |
|---|---|
| *H02M 3/07* | (2006.01) |
| *H02M 3/18* | (2006.01) |
| *G05F 1/10* | (2006.01) |
| *H02M 1/44* | (2007.01) |

(52) U.S. Cl.
CPC ............ *H02M 3/07* (2013.01); *H02M 1/44* (2013.01)

(58) Field of Classification Search
CPC ........ H02M 3/07; H02M 3/073; H02M 3/075; H02M 1/32; H02M 1/025; H02M 1/44; H02M 2001/009; H02M 2001/0083; H02M 2003/071; H02M 2003/072; H02M 2003/077; H02M 2003/076; H03F 3/2171; H03F 3/72; H03F 3/18; G05F 1/02; G05F 1/08; G05F 1/10
See application file for complete search history.

(56) References Cited

U.S. PATENT DOCUMENTS

| | | | |
|---|---|---|---|
| 6,411,531 B1 * | 6/2002 | Nork ................. | H02M 3/073 363/60 |
| 7,271,642 B2 * | 9/2007 | Chen ................. | H05B 45/37 327/514 |
| 7,400,204 B2 | 7/2008 | Thomsen et al. | |
| 7,427,900 B2 | 9/2008 | Manetakis et al. | |
| 8,054,125 B2 | 11/2011 | Nervegna | |
| 8,179,163 B2 | 5/2012 | Yu | |
| 8,598,946 B2 | 12/2013 | Drost et al. | |
| 9,160,166 B2 | 10/2015 | Fernald | |
| 9,553,572 B2 | 1/2017 | Powell | |
| 9,979,282 B2 | 5/2018 | Fernald | |
| 10,073,478 B1 * | 9/2018 | Ivanov ............... | G05F 1/575 |

* cited by examiner

*Primary Examiner* — An T Luu
(74) *Attorney, Agent, or Firm* — Gary Stanford; Huffman Law Group, PC (57) ABSTRACT

A charge pump system including charge pump circuitry, a charge pump controller, and current limit circuitry. The charge pump circuitry has an input coupled to a supply input node and has an output for developing a drive voltage. The charge pump controller controls the charge pump circuitry to increase the drive voltage above a supply voltage provided to the supply input node. The current limit circuitry limits current through the charge pump circuitry to a limited current level that is less than a maximum current level during a current limit mode to reduce current spikes at the nodes of the charge pump system that may generate EMI. A current mirror may be used as the current limit circuitry to directly limit current through switches of the charge pump circuitry. The timing of the charge pump switches may also be modified such as inserting strategic delays to reduce the current spikes.

20 Claims, 7 Drawing Sheets

*FIG. 4 (CURRENT LIMIT MODE)*

*FIG. 5 (NORMAL MODE)*

CHARGE PUMP SYSTEM WITH ELECTROMAGNETIC INTERFERENCE MITIGATION

BACKGROUND OF THE INVENTION

Field of the Invention

The present invention relates in general to electronic charge pumps, and more particularly to a method of mitigating electromagnetic interference (EMI) caused by a charge pump used to increase voltage for driving another electronic device, such as a display.

Description of the Related Art

The Internet of Things (IoT) is a network of physical devices or other items embedded with electronics, software, sensors, actuators, etc., which enables devices to interface each other and to exchange information. A home automation system, for example, may be used to control devices and functions in a home or the like, such as lighting, HVAC (climate control), entertainment systems, appliances, home security devices (including access control and alarm systems and the like), etc. It is understood, of course, that IoT encompasses much more than home automation and residential applications and may be used for various commercial applications. IoT may be implemented using any one of many different wireless technologies, such as ZigBee, Thread, Z-wave, etc.

The electronic circuitry of a device may be configured to operate at relatively low voltage levels to conserve power. Devices, including IoT devices and the like, may include higher voltage devices such as a display. A liquid crystal display (LCD), for example, may operate at a higher voltage level than the supply voltage provided to the electronic circuitry of the device. A charge pump may be included to increase the voltage level of the supply voltage for purposes of driving the higher voltage devices including the display. A charge pump may be implemented using a switched-capacitor circuit that toggles between pre-charging and charge pump phases to multiply voltage over successive switching cycles. The operation of switching capacitive devices of the charge pump, however, tends to generate large current spikes that are driven through conductors with parasitic inductance. The higher currents flowing through the parasitic inductances generates electromagnetic fields that may interfere with surrounding circuitry.

As an example, an IoT device may include a radio receiver with an antenna coupled with a conductor also having a parasitic inductance. When a charge pump or the like is included or otherwise operated nearby, it generates electromagnetic interference (EMI) that may be coupled into the parasitic inductances near the antenna of the radio circuitry. The induced energy may cause undesired radio frequency (RF) interference that negatively impacts performance of the radio.

SUMMARY OF THE INVENTION

A charge pump system according to one embodiment includes charge pump circuitry, a charge pump controller, and current limit circuitry. The charge pump circuitry includes switches and at least one capacitor, has an input coupled to a supply input node and has an output for developing a drive voltage. The charge pump controller controls the switches of the charge pump circuitry to control coupling of the at least one capacitor to increase the drive voltage above a supply voltage provided to the supply input node. The current limit circuitry allows current through the charge pump circuitry to reach a maximum current level during a normal mode, and limits current through the charge pump circuitry to a limited current level that is less than the maximum current level during a current limit mode.

A decoupling capacitor may be coupled between the output of the charge pump circuitry and a supply reference node, and a resistor may be coupled between the output of the charge pump circuitry and a drive node developing the drive voltage. In one embodiment, the current limit circuitry may be coupled between the supply input node and the input of the charge pump circuitry. In this case, the current limit circuitry is enabled during the current limit mode to limit current from the supply input node to the limited current level. In another embodiment, the current limit circuitry may be coupled to the charge pump controller, in which the current limit circuitry is operative during the current limit mode to limit a drive capacity of the charge pump controller.

The charge pump circuitry may include a first switch that couples a top end of the at least one capacitor to the supply input node during a pre-charge phase, and a second switch that couples a bottom end of the at least one capacitor to the supply input node during a pump phase. The charge pump may include first and second drivers in which the first driver controls the first switch and the second driver controls the second switch. The first driver includes source terminals coupled between the drive voltage and a gate node. The second driver includes source terminals coupled between the supply input node and the gate node. The current limit circuitry may drive the gate node to a limit voltage level during the current limit mode so that current through the first switch is limited to the limited current level when turned on during the pre-charge phase, and so that current through the second switch is limited to the limited current level when turned on during the charge phase.

The first and second switches may be transistor devices, such as MOS devices or the like. The current limit circuitry may be configured as current mirror circuitry including a current limit circuit, and may further include mode circuitry. In the current limit mode, the first and second switches are coupled to the current limit circuitry to limit current based on the current limit circuit.

The charge pump circuitry may include a first switch having current terminals coupled between the supply input node and a top node, a second switch having current terminals coupled between a bottom node and a supply reference node, a third switch having current terminals coupled between the supply input node and the bottom node, a fourth switch having current terminals coupled between the top node and an output node, and a pump capacitor coupled between the top and bottom nodes. During the current limit mode, the charge pump controller turns on the first and second switches and turns off the third and fourth switches during a pre-charge phase, and then turns off the first and second switches to start a pump phase, and then turns on the third switch after turning off the first and second switches during the pump phase, and lastly turns on the fourth switch after a first delay period during the pump phase.

In addition, during the current limit mode, the charge pump controller may further turn off the third and fourth switches to terminate the pump phase, and then turn on the second switch after turning off the third and fourth switches, and lastly turn on the first switch after a second delay period to begin a next pre-charge phase.

The first delay period may be sufficiently long to ensure that a voltage level of the top node is above a voltage level of the output node, and the second delay period may be sufficiently long to ensure that a voltage level of the top node is less than a voltage level of the supply input node.

The charge pump circuitry may further include a fifth switch having current terminals coupled between the bottom node and the supply reference node. In this case, during the current limit mode, the charge pump driver turns off the fifth switch during the pump phase, and the charge pump driver further turns off the third and fourth switches to terminate the pump phase, and then turns on the fifth switch after turning off the third and fourth switches, and lastly turns on the first and second switches after a second delay to begin a next pre-charge phase.

A method of operating a charge pump system according to one embodiment includes controlling charge pump circuitry including switches and at least one capacitor to drive a voltage level of a drive voltage developed on a drive node above a voltage level of a supply voltage provided to an input of the charge pump circuitry, allowing current through the charge pump circuitry to reach a maximum current level during a normal mode, and limiting current through the charge pump circuitry to a limited current level that is less than the maximum current level during a current limit mode.

The method may further include providing current limit circuitry between the supply voltage and the input of the charge pump circuitry, bypassing the current limit circuitry during the normal mode, and selecting the current limit circuitry during the current limit mode to limit current from the supply voltage to the input of the charge pump circuitry to the limited current level during the current limit mode.

The method may further include providing a first switch that couples a top end of the at least one capacitor to a supply input node receiving the supply voltage during a pre-charge phase, providing a second switch that couples a bottom end of the at least one capacitor to the supply input node during a pump phase, and controlling the first and second switches to limit current through the first and second switches to the limited current level when turned on.

The method may include providing a charge pump controller including drive circuitry that controls the first and second switches during the pre-charge and pump phases, providing current mirror circuitry coupled to the charge pump controller, and enabling the current mirror circuitry to limit a drive capacity of the drive circuitry.

The method may include providing a charge pump controller including drive circuitry that controls the first and second switches during the pre-charge and pump phases, providing current mirror circuitry coupled to the charge pump controller, and coupling the first switch in parallel with a current limited device within the current mirror circuitry to limit current through the first switch when turned on, and coupling the second switch in parallel with the current limited device to limit current through the second switch when turned on.

The method may include providing a first switch having current terminals coupled between a top node and a supply input node receiving the supply voltage, providing a second switch having current terminals coupled between a bottom node and a supply reference node, providing a third switch having current terminals coupled between the supply input node and the bottom node, providing a fourth switch having current terminals coupled between the top node and the drive node, and providing a pump capacitor coupled between the top and bottom nodes. During the current limit mode, the method may include turning on the first and second switches and turning off the third and fourth switches during a pre-charge phase, turning off the first and second switches to terminate the pre-charge phase and start a pump phase, turning on the third switch after turning off the first and second switches during the pump phase, and turning on the fourth switch after a first delay period during the pump phase.

During the current limit mode, the method may further include turning off the third and fourth switches to terminate the pump phase, turning on the second switch after turning off the third and fourth switches, and turning on the first switch after a second delay period to begin a next pre-charge phase.

The first delay period may be a sufficiently long period to ensure that a voltage level of the top node is above a voltage level of the output node, and the second delay period may be a sufficiently long to ensure that a voltage level of the top node is less than a voltage level of the supply input node.

The method may include providing a fifth switch having current terminals coupled between the bottom node and the supply reference node. During the current limit mode, the method may include turning off the fifth switch during the pump phase, turning off the third and fourth switches to terminate the pump phase, turning on the fifth switch after turning off the third and fourth switches, and turning on the first and second switches after a second delay sufficiently long to ensure that a voltage level of the top node is less than a voltage level of the supply input node to begin a next pre-charge phase.

BRIEF DESCRIPTION OF THE DRAWINGS

The present invention is illustrated by way of example and is not limited by the accompanying figures in which like references indicate similar elements. Elements in the figures are illustrated for simplicity and clarity and have not necessarily been drawn to scale.

DETAILED DESCRIPTION

The inventors have recognized the possible negative impact of charge pump circuitry on nearby electronic circuitry, such as a radio receiver circuit. For example, conventional charge pump circuitry generates large current spikes during operation which may generate electromagnetic interference (EMI) when flowing through parasitic inductances of the circuitry. The EMI has a negative impact on nearby circuitry, particularly communication circuitry that may also incorporate parasitic inductance that may cause radio frequency (RF) interference or the like. They have therefore developed a system and method of EMI mitigation caused by charge pump circuitry.

Figure 1:
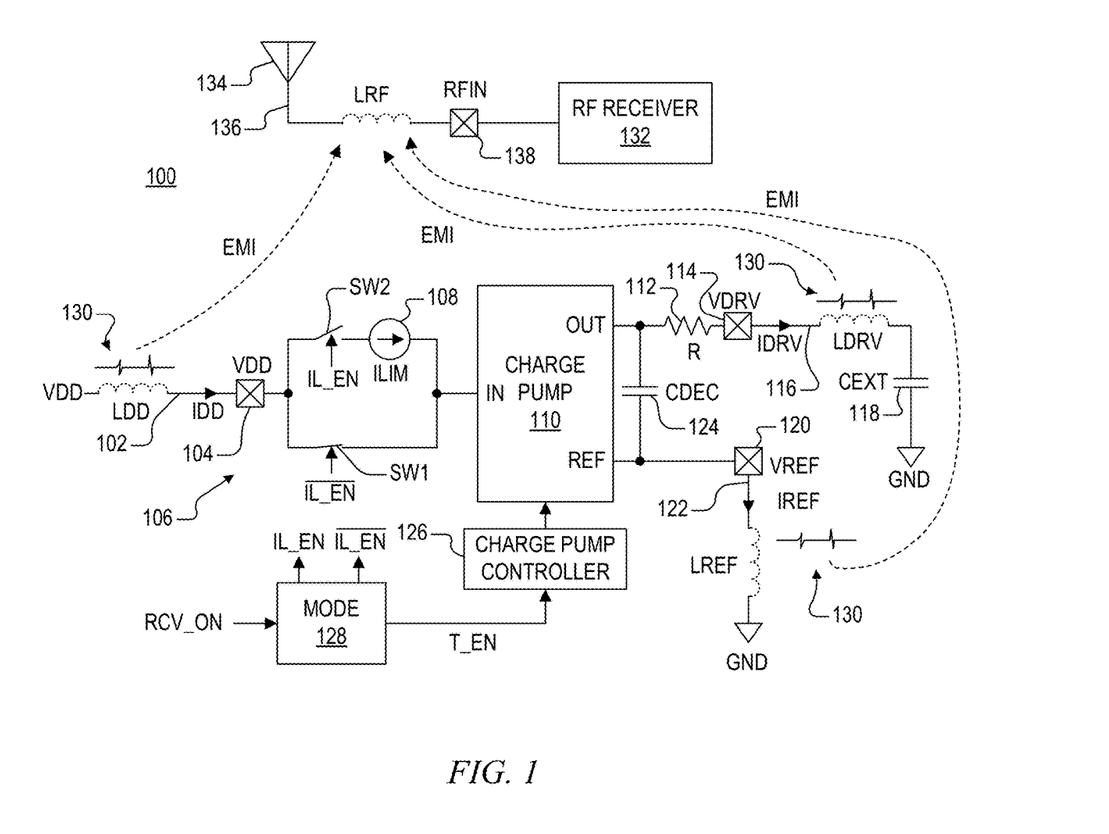
FIG. 1 is a simplified block diagram of an electronic system including EMI mitigation implemented according to an embodiment of the present disclosure.

FIG. 1 is a simplified block diagram of an electronic system 100 including EMI mitigation implemented according to an embodiment of the present disclosure. A supply voltage VDD is provided through a conductor 102 to an electrical interface 104 providing VDD to a charge pump system 106. The electrical interface 104 is coupled to one terminal of a first single-pole, single throw (SPST) switch SW1 and to one terminal a second SPST switch SW2. The switch SW2 is controlled by a current limit enable signal IL_EN, and the switch SW1 is controlled by an inverted version of IL_EN, shown as $\overline{IL\_EN}$. It is understood throughout this disclosure that $\overline{IL\_EN}$ is negated when IL_EN is asserted and that $\overline{IL\_EN}$ is asserted when IL_EN is negated. The other terminal of SW1 is coupled to the input (IN) of charge pump circuitry 110. The other terminal of SW2 is coupled to an input of a current limit circuit 108, which has an output coupled to the input of the charge pump circuitry 110. The charge pump circuitry 110 has an output (OUT) coupled through a resistor (resistance R) 112 to an electrical interface 114 developing a drive voltage VDRV. An external capacitor (CEXT) 118 has one end coupled to the electrical interface 114 via a conductor 116 and has its other end coupled to a supply reference node, such as ground (GND). The charge pump circuitry 110 also has a reference node (REF) coupled to an electrical interface 120 developing a supply reference voltage VREF, which is also coupled to GND via another conductor 122. A decoupling capacitor (CDEC) 124 is coupled between the OUT and REF terminals of the charge pump circuitry 110. A charge pump controller 126 controls switching of the charge pump circuitry 110 as further described herein.

Mode circuitry 128 provides the signals IL_EN and $\overline{IL\_EN}$ to control the switches SW1 and SW2. The mode circuitry 128 may also provide a timing enable signal T_EN to the charge pump controller 126 to adjust charge pump timing as further described herein. The mode circuitry 128 switches between multiple modes of operation as further described herein, in which the multiple modes at least include a normal mode and a current limit mode.

When the mode circuitry 128 negates the enable signal IL_EN for the normal mode of operation (asserting $\overline{IL\_EN}$), the switch SW1 is closed and the switch SW2 is open as graphically depicted in FIG. 1. In the normal mode, VDD is provided through the conductor 102, the electrical interface 104, and the switch SW1 to the input of the charge pump circuitry 110. The conductor 102, the electrical interface 104, and the switch SW1 are generally configured with relatively low resistance so that the current provided to the charge pump circuitry 110 may reach a maximum current level. The charge pump circuitry 110 may be implemented in any one of many different ways, but generally at least includes a pre-charge phase to charge one or more pump capacitors and a pump phase in which the charge developed on the pump capacitor(s) is redirected to the output through resistor 112 to capacitor 118 via the electrical interface 114. Operation toggles between the pre-charge and pump phases in consecutive cycles to "pump" charge at the output to increase the voltage of VDRV applied across capacitor 118. Capacitor 118 may represent a circuit being driven by the drive voltage VDRV developed at the electrical interface 114, such as a liquid crystal display (LCD) or the like.

The switching periods between the charge pump phases generates significant current spikes through the conductors 102, 116, and 122 as depicted by a graphic 130 at each of these conductors. In particular, each of the conductors 102, 116, and 122 incorporates a corresponding parasitic inductance LDD, LDRV, and LREF, respectively. The parasitic inductances LDD, LDRV, and LREF are shown using dotted lines representing parasitic inductances of the conductors rather than physical inductors. The current spikes depicted by graphic 130 through the parasitic inductances LDD, LDRV, and LREF caused by the switching phases (between the pre-charge and pump phases) generates interference in the form of EMI which may interfere with nearby electrical circuitry. As an example, the electronic system 100 may include a nearby radio frequency (RF) receiver 132 having an input coupled to an external antenna 134 through a conductor 136 and an RF interface (RFIN) electrical interface 138. The conductor 136 may also include a parasitic inductance LRF, in which the EMI generated at the parasitic inductances LDD, LDRV, and LREF of the charge pump system 106 is coupled through the parasitic inductance LRF and possibly through the antenna 134 generating undesired RF interference. The RF interference may reduce the performance of the RF receiver 132, such as reducing the signal-to-noise ratio (SNR) or even interfering with detection of a radio signal being received.

In a more specific configuration, the charge pump system 106 and the RF receiver 132 of the electronic system 100 may be incorporated on an integrated circuit (IC) or semiconductor device or the like, in which the electrical interfaces 104, 114, 120, and 138 are pins or pads of the IC. The conductors 102, 116, 122, and 136 may be bondwires or the like for coupling the pins of the IC to external components. VDD may be a source voltage input, VREF may be a ground pin, VDRV may be a drive pin for driving an external circuit, such as an LCD or the like, and RFIN may receive RF signals detected by the antenna 134 for delivery to the RF receiver 132. An IoT device, for example, may include both an RF receiver (or transceiver) and an output for driving a local display. VDD may be at a lower voltage level, such as 1.6 Volts (V), whereas the display may need a driving voltage of 3V or more. The charge pump system 106 uses VDD to drive the voltage of VDRV to the higher level to drive the display. In such a configuration, the charge pump system 106 may be in close proximity to the RF receiver 132 so that the bondwires are sufficiently close to each other to couple electromagnetic energy. The EMI generated by operation of the charge pump system 106 may cause substantial RF interference negatively impacting RF performance.

A current IDD flows through the conductor 102 (and thus through the inductance LDD), a current IDRV flows through the conductor 116 (and thus through the inductance LDRV), and a current IREF flows through the conductor 122 (and thus through the inductance LREF). Assuming that the charge pump circuit 110 is a two-phase switched capacitor configuration toggling between a pre-charge phase and a pump phase, and assuming that IL_EN is negated (for the normal mode) so that current through the charge pump circuit 110 is not limited by the current limit circuit 108, the currents IDD, IDRV and IREF exhibit large current spikes. When switching from the pre-charge phase to the pump phase, IREF exhibits a large positive current spike and IDRV exhibits a very large negative current spike referred to as a backflow current. When switching from the pump phase to the pre-charge phase, IDD and IREF both exhibit relatively large backflow current spikes.

VDD may be coupled directly to the input of the charge pump circuitry 110 via the electrical interface 104 or through other conductive means. In the embodiment of FIG. 1, the switches SW1 and SW2 are provided to selectively activate the current limit circuit 108 to limit the current provided to and through the charge pump circuitry 110. When IL_EN is asserted (and $\overline{IL\_EN}$ negated) for the current limit mode, the switch SW1 is opened and the switch SW2 is closed so that the current limit circuit 108 limits source current to a limited current level that reduces the amplitude of the IDD, IDRV, and IREF current spikes. The current limit circuit 108 may limit current flow at or up to a predetermined maximum level that is less than the maximum current level of the normal mode in order to reduce the amplitude of the current spikes, which in turn reduces the amount of generated EMI.

Limiting the current using the current limit circuit 108 or the like reduces EMI but may also reduce the overall efficiency of the charge pump circuitry 110. The amount of charge stored during each pre-charge phase may be reduced in the current limit mode, so that additional cycles are needed to drive VDRV to the desired voltage level. In one embodiment, the mode circuitry 128 receives a signal RCV_ON that indicates when the RF receiver 132 is operating and actively receiving a signal. When RCV_ON is asserted indicating that the RF receiver 132 is active, the mode circuitry 128 asserts IL_EN to reduce current and EMI to reduce RF interference. Otherwise, when RCV_ON is negated indicating that the RF receiver 132 is not actively receiving an RF signal, then the mode circuitry 128 negates IL_EN so that the charge pump system 106 operates at its optimal level in its normal mode.

In addition, when the current is limited, operation of the charge pump circuitry 110 may be negatively impacted, such as increased stress on the switching devices (e.g., switching transistors). The mode circuitry 128 may also assert T_EN to the charge pump controller 126 to modify switch timing to improve operation of the charge pump circuitry 110 as further described herein. The decoupling capacitor 124 is also added to improve operation for each of the modes of operation (e.g., normal and current limit modes) as further described herein.

Figure 2:
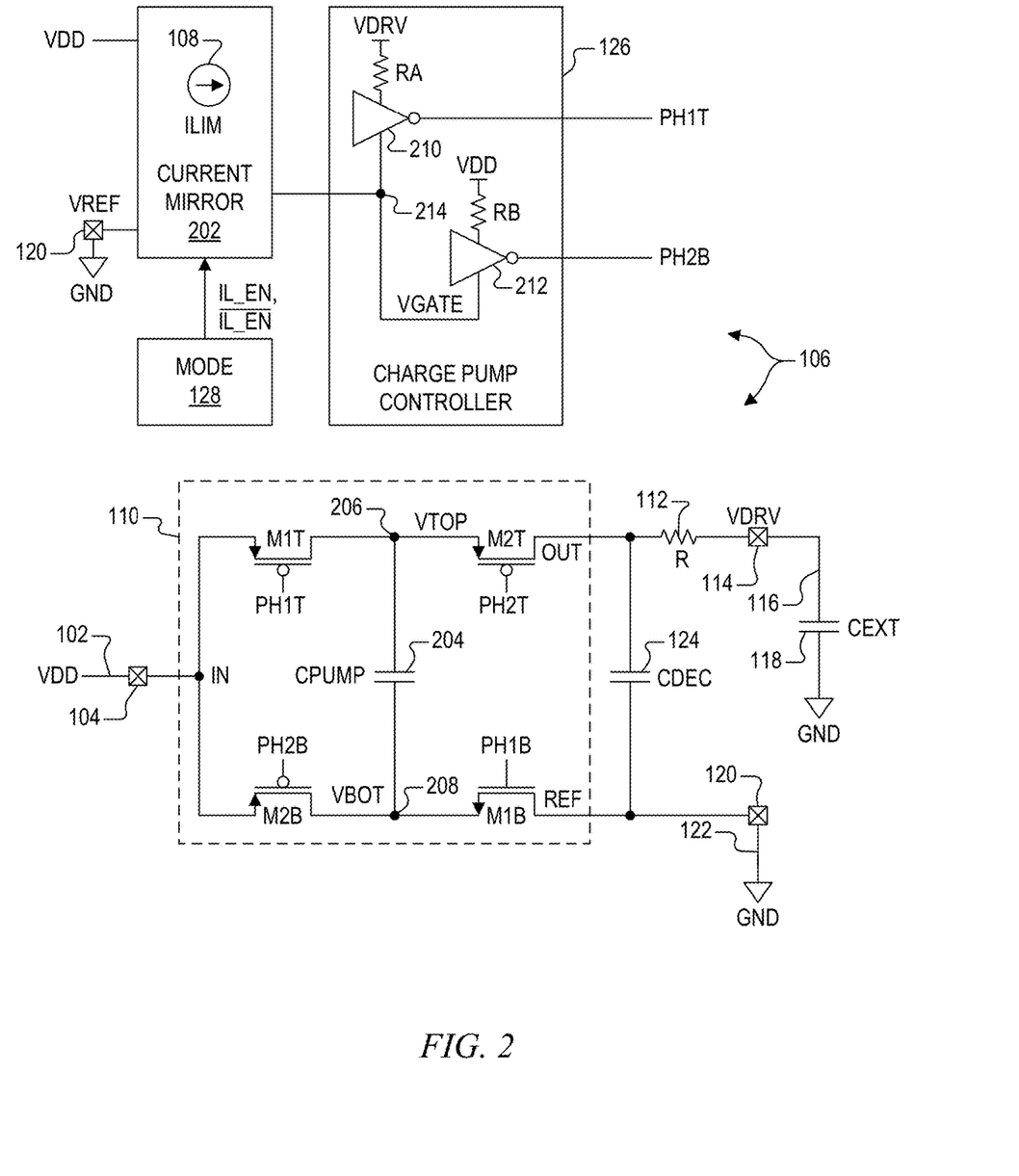
FIG. 2 is a schematic and block diagram of the charge pump system of FIG. 1 including current mirror circuitry implemented according to one embodiment of the present disclosure coupled to a more specific configuration of the charge pump controller and the charge pump circuitry of FIG. 1.

FIG. 2 is a schematic and block diagram of the charge pump system 106 including current mirror circuitry 202 implemented according to one embodiment of the present disclosure coupled to a more specific configuration of the charge pump controller 126 and the charge pump circuitry 110. The switches SW1 and SW2 are not included and the current limit circuit 108 is incorporated within the current mirror circuitry 202 for limiting current as further described herein. In the illustrated embodiment, the charge pump circuitry 110 includes switches or switching transistors M1T, M2T, M1B, and M2B and a pump capacitor (CPUMP) 204. The transistors may be MOS transistors including an NMOS transistor M1B and PMOS transistors M1T, M2T, and M1B.

In the illustrated configuration, M1T and M2B have their source terminals coupled together at the electrical interface 104, which receives the supply voltage VDD via the conductor 102. The drain terminal of M1T is coupled to the source terminal of M2T at a top node 206 developing a voltage VTOP, and the drain terminal of M2B is coupled to the source terminal of M1B at a bottom node 208 developing a voltage VBOT. The CPUMP capacitor 204 is coupled between the top node 206 and the bottom node 208. The drain terminal of M2T forms the OUT node of the charge pump circuitry 110, which is coupled to one end of the resistor 112, and the drain terminal of M1B forms the REF node which is coupled to the electrical interface 120. The gate terminal of M1T receives a pre-charge phase signal PH1T, the gate terminal of M1B receives another pre-charge phase signal PH1B, the gate terminal of M2B receives a pump phase signal PH2B, and the gate terminal of M2T receives another pump phase signal PH2T.

In a similar manner previously described, the other end of the resistor 112 is coupled to the electrical interface 114, which is coupled to one end of the capacitor 118 via the conductor 116. The other end of the capacitor 118 is coupled to GND. Also, the electrical interface 120 is coupled to GND via the conductor 120, and the CDEC capacitor 124 is coupled between the OUT and REF terminals, respectively, of the charge pump circuitry 110. The parasitic inductances are not shown but are assumed to be inherent in the conductors 102, 116, and 122 as previously described.

The switching transistors of the charge pump circuitry 110 each have a control terminal (e.g., gate terminal) and a pair of current terminals (e.g., source and drain terminals). These switching transistors are generally configured operate as switches for selectively connecting two electrical nodes together. For example, M1T selectively couples the electrical interface 104 to the VTOP node 206, M2B selectively couples the electrical interface 104 to the VBOT node 208, M2T selectively couples the VTOP node 206 to the electrical interface 114 via the resistor 112, and M1B selectively couples the VBOT node 208 to the electrical interface 120. It is noted, however, that the switching transistors may also be controlled in such a manner to limit current through their current terminals as further described herein. For example, M1T may be controlled to limit current from its source terminal to its drain terminal to ILIM, and M2B may also be controlled to limit current from its source terminal to its drain terminal to ILIM.

General operation of the charge pump circuitry 110 is first described. M1T and M1B are turned on to couple the capacitor 204 between VDD and GND while M2B and M2T are turned off so that capacitor 204 is charged during the pre-charge phase. M1T and M1B are then turned off and M2B and M2T are turned on during the pump phase to increase the voltage levels of VBOT and VTOP by VDD and to deliver charge from CPUMP capacitor 204 to CEXT capacitor 118. After repetitive cycles, VDRV is driven to about twice the voltage of VDD to drive external circuitry (represented by capacitor 118). When M2T is first turned on, there may be a rush of backflow current from VDRV. This rush current is detoured at least in part through a loop formed by capacitor 124 and resistor 112, which reduces EMI even during the normal mode.

The charge pump controller 126 includes a first inverting output buffer 210 driving the phase signal PH1T and a second inverting output buffer 212 driving the phase signal PH2B. Although not shown, similar drive circuitry is provided within the charge pump controller 126 for driving the phase signals PH2T and PH1B. The inverting output buffer 210 has an upper supply terminal coupled to VDRV through a resistors RA, and the inverting output buffer 210 has an upper supply terminal coupled to the supply voltage VDD through a RB. Also, the inverting output buffers 210 and 212 each include a lower supply terminal coupled together at a node 214 developing a voltage VGATE. Node 214 is coupled to and controlled by the current mirror circuit 202.

When the mode circuitry 128 negates IL_EN to turn off current limiting for the normal mode of operation, the current mirror 202 couples the VGATE node 214 to GND (via the electrical interface 120) so that when the inverting output buffer 210 pulls PH1T low to turn on M1T or when the inverting output buffer 212 pulls PH2B low to turn on M2B, these transistors are turned fully on to allow full current operation. When instead the mode circuitry 128 asserts IL_EN for the current limit mode, the VGATE node 214 is driven by the current mirror circuitry 202 to a voltage that limits the current through M1T or M2B to ILIM (or a current proportional to ILIM) thereby limiting the current during switching. As described further herein, M1T or M2B are effectively placed in parallel with a current path within the current mirror circuitry 202 to limit current to ILIM (or a current proportional to ILIM) to reduce EMI.

Figure 3:
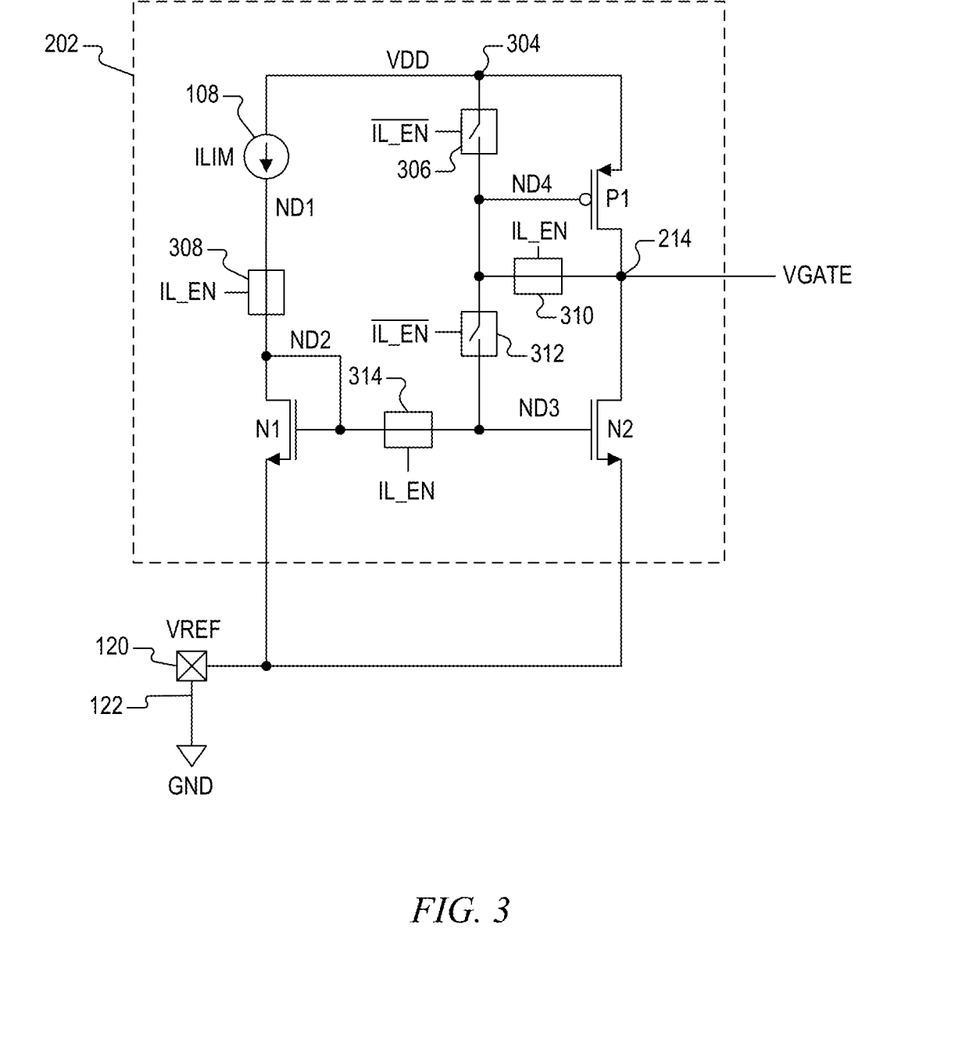
FIG. 3 is a schematic diagram of the current mirror circuitry of FIG. 2 implemented according to one embodiment of the present disclosure.

FIG. 3 is a schematic diagram of the current mirror circuitry 202 implemented according to one embodiment of the present disclosure. VDD is provided to an upper node 304, which is coupled to an input of the current limit circuit 108, to one terminal of an SPST switch 306, and to the source terminal of a PMOS transistor P1. The output of the current limit circuit 108 is coupled to one terminal of another SPST switch 308, having its other terminal coupled to the drain and gate terminals of an NMOS transistor N1. The source terminal of N1 is coupled to the electrical interface 120, which is coupled to GND via the conductor 122 as previously described. The other terminal of the switch 306 is coupled to the gate terminal of P1, to one terminal of an SPST switch 310 and to one terminal of another SPST switch 312. The other terminal of switch 312 is coupled to the gate terminal of another NMOS transistor N2 and to one terminal of another SPST switch 314. The other terminal of switch 314 is coupled to the gate terminal of N1 and the source terminal of N2 is coupled to the electrical interface 120. The drain terminal of P1 is coupled to the VGATE node 214, which is further coupled to the other terminal of switch 310 and to the drain terminal of N2.

The SPST switches 308, 310, and 314 are controlled by IL_EN and the SPST switches 306 and 312 are controlled by $\overline{IL\_EN}$ (thus all of these switches are ultimately controlled by the state of IL_EN). The switch symbols are depicted for IL_EN asserted and $\overline{IL\_EN}$ negated, in which switches 308, 310, and 314 are closed and switches 306 and 312 are opened. The state of each switch is reversed when IL_EN is negated for the normal mode of operation.

The output of the current limit circuit 108 is coupled to a first node ND1, the drain and source terminals of N1 are coupled together at a second node ND2, the gate terminal of N2 is coupled to a third node ND3, and the gate terminal of P1 is coupled to a fourth node ND4. The switches 306, 308, 310, 312, and 314 are part of or otherwise controlled by the mode circuitry 128 for reconfiguring the current mirror circuitry 202 between the normal and current limit modes. When in the current limit mode, the switches 308 and 314 couple the nodes ND1, ND2 and ND3 together for receiving ILIM, and the switch 310 couples ND4 to the VGATE node 214. Also, the switches 306 and 312 isolate ND4 from ND3 and VDD. When in the normal mode, the switch 308 isolates ND1, the switch 314 isolates ND2, and the switches 306 and 312 couple nodes ND3 and ND4 together and to VDD. Also, the switch 310 isolates nodes ND3 and ND4 from the VGATE node 214.

Figure 4:
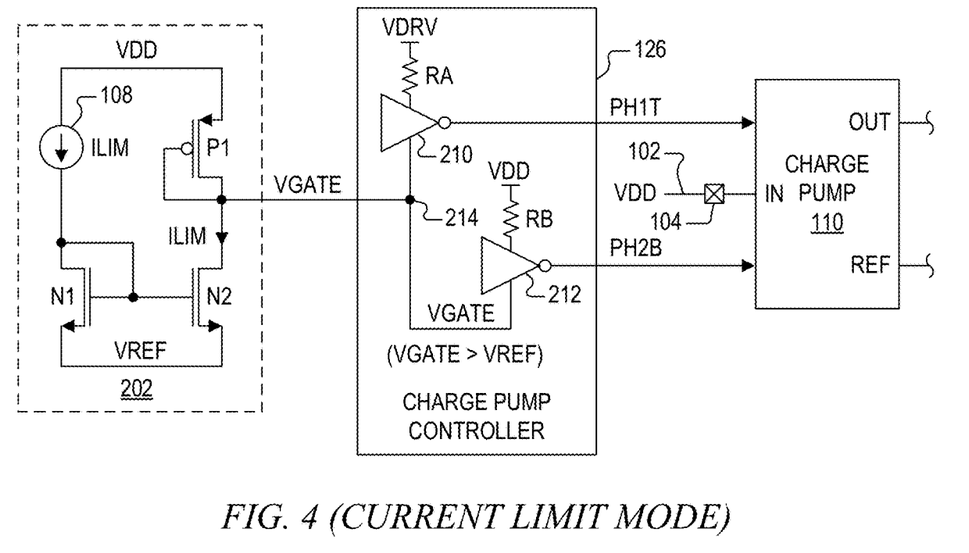
FIG. 4 is a simplified schematic diagram of charge pump system of FIG. 1 showing the configuration of the current mirror circuit of FIG. 2 when the current limit mode is activated according to one embodiment of the present disclosure.

FIG. 4 is a simplified schematic diagram of charge pump system 106 showing the configuration of the current mirror circuit 202 when IL_EN is asserted for activating the current limit mode according to one embodiment of the present disclosure. Some of the details are omitted in FIG. 4 for clarity. For example, the charge pump circuitry 110 is shown in simplified form yet configured substantially as shown in FIG. 2, and the output portion including the resistor 112, the capacitors 118 and 124, and the electrical interfaces 114 and 120 may be included but are not shown. Within the current mirror circuit 202, diode-coupled N1 and P1 are coupled to N2 in a current-mirror configuration so that the drain currents of P1 and N2 are proportional to the drain current of N1. Assuming that N1 and N2 are about the same size, then ILIM flows through P1. When the inverting output buffer 210 pulls PH1T low to turn on M1T, the source and gate terminals of M1T are effectively coupled to the source and gate terminals of P1, respectively, so that the current through M1T is proportional to ILIM. Likewise, when the inverting output buffer 212 pulls PH2B low to turn on M2B, the source and gate terminals of M2B are effectively coupled to the source and gate terminals of P1, respectively, so that the current through M2B is also proportional to ILIM. The proportionality depends on the size of P1 relative to the sizes of M1T and M2B. In summary, when IL_EN is asserted, the current through M1T and M2B is controlled by ILIM for the current limit mode.

Figure 5:
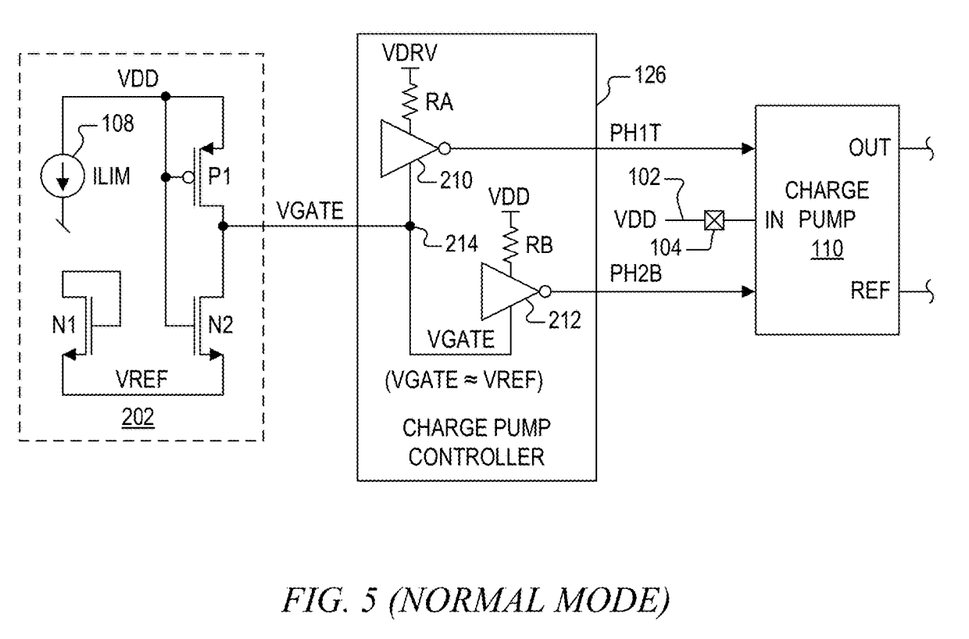
FIG. 5 is a simplified schematic diagram of charge pump system of FIG. 1 showing the configuration of the current mirror circuit of FIG. 2 for the normal mode of operation according to one embodiment of the present disclosure.

FIG. 5 is a simplified schematic diagram of charge pump system 106 showing the configuration of the current mirror circuit 202 when IL_EN is negated for disabling current limit for the normal mode of operation according to one embodiment of the present disclosure. Again, some of the details are omitted in FIG. 5 for clarity. When IL_EN is negated, the switches 308, 310, and 314 are opened and the switches 306 and 312 are closed so that the current limit circuit 108 and N1 are both disconnected. The gate terminals of P1 and N2 are both pulled high turning P1 off and N2 on, so that the VGATE node 214 is pulled low to GND via the electrical interface 120. In this configuration, when either M1T or M2B is turned on during switching, it is turned fully on for full current switching operation.

Figure 6:
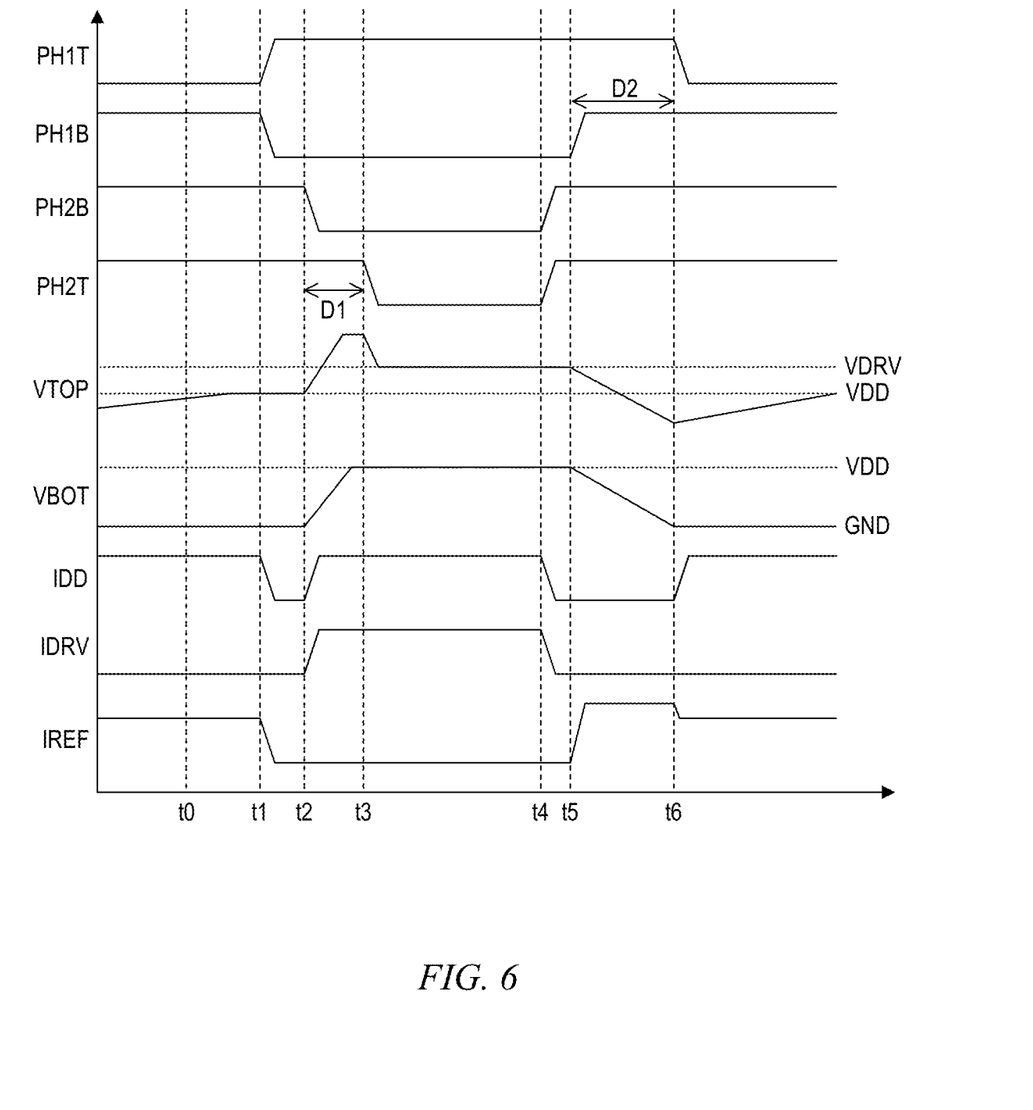
FIG. 6 is a timing diagram illustrating operation of the charge pump controller for controlling timing of the charge pump circuitry of FIG. 1, configured as shown in FIG. 2, during the current limit mode according to one embodiment of the present disclosure.

FIG. 6 is a timing diagram illustrating operation of the charge pump controller 126 for controlling timing of the charge pump circuitry 110, configured as shown in FIG. 2, when the mode circuitry 128 asserts both the IL_EN and T_EN enable signals according to one embodiment of the present disclosure. The current limit circuitry may be configured as shown in either FIG. 1 or FIG. 3 or any other suitable current limit configuration, but is active in any case to limit current during the current limit mode. The control signals PH1T, PH1B, PH2B, PH2T, the voltages VTOP and VBOT, and the currents IDD, IDRV and IREF are plotted versus time illustrating operation from a pre-charge phase to a pump phase and then back to a subsequent pre-charge phase.

At a first time t0, PH1T is asserted low while PH1B, PH2B and PH2T are asserted high so that M1T and M1B are turned on while M2B and M2T are turned off. The capacitor 204 is coupled between VDD and GND so that VBOT is pulled low to GND while VTOP charges to the voltage level of VDD. The currents IDD and IREF are "high" for charging the pump capacitor while IDRV is low. At a subsequent time t1 after the capacitor 204 is fully charged, PH1T is pulled high while PH1B is pulled low turning off M1T and M1B to terminate the first pre-charge phase, and the currents IDD and IREF go low. After a short delay at a time t2, PH2B is pulled low turning on MB2 to begin the pump phase. The currents IDD and IDRV go high and the voltage VBOT ramps up towards VDD while VTOP ramps up above VDD. PH2T remains high keeping M2T off for a delay period D1. The delay period D1 is inserted to ensure that VTOP rises above VDRV before turning on M2T to avoid backflow current from CEXT capacitor 118 to CPUMP capacitor 204. At a subsequent time t3 after the delay period D1, PH2T is pulled low to turn on M2T to deliver charge from CPUMP capacitor 204 to CEXT capacitor 118. VTOP falls to the voltage level of VDRV while the currents IDD and IDRV remain high.

The delay D1 may be implemented as a fixed delay period for a given configuration. D1 may be empirically determined for a given circuit configuration. For example, a simple delay function may be included. In an alternative embodiment, a voltage comparator (not shown) may be included to compare VTOP and VDRV in which the charge pump controller 126 pulls PH2T low only after the comparator triggers when VTOP exceeds VDRV.

At a subsequent time t4, PH2B and PH2T are pulled high to turn off M2B and M2T to terminate the pump phase. The currents IDD and IDRV go low. After a short delay, PH1B is pulled high to turn on M1B while M1T remains off. The current IREF goes high and the voltages VTOP and VBOT begin ramping down. PH1T remains high keeping M1T off for a second delay period D2. The delay period D2 is inserted to ensure that VTOP falls below VDD before turning on M1T to avoid backflow current from capacitor 204 to VDD. At a subsequent time t6 after the delay period D2, PH1T is pulled low to turn on M1T to begin recharging capacitor 204 for the next cycle. When PH1T is pulled low and M1T is turned on, the current IDD goes high and IREF falls somewhat for the pre-charge cycle, and VTOP rises back to VDD.

In a similar manner described for the delay D1, the delay D2 may also be implemented as a fixed delay period for a given configuration. D2 may be empirically determined for a given circuit configuration. For example, a simple delay function may be included. In an alternative embodiment, a voltage comparator (not shown) may be included to compare VTOP and VDD in which the charge pump controller 126 pulls PH1T low only after the comparator triggers when VTOP falls below VDD.

Figure 7:
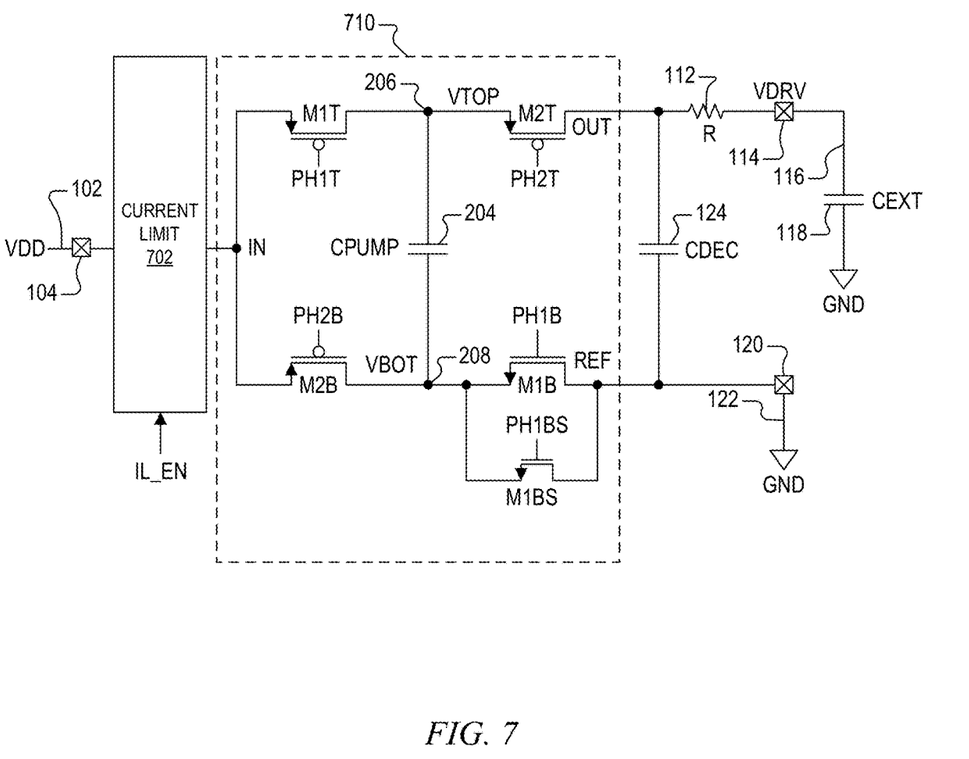
FIG. 7 is a schematic and block diagram of a portion of the charge pump system of FIG. 1 including charge pump circuitry implemented according to another embodiment of the present disclosure.

FIG. 7 is a schematic and block diagram of a portion of the charge pump system 106 including charge pump circuitry 710 implemented according to another embodiment of the present disclosure. VDD is provided through the conductor 102 and the electrical interface 104 to an input of current limit circuitry 702. The current limit circuitry 702 may be configured similar to that shown in FIG. 1 with switches SW1 and SW2 and the current limit circuit 108 for limiting current through the charge pump circuitry 710, or may be implemented similar to that shown in FIG. 3 for controlling switches within the current limit circuitry 702 similar to that shown in FIGS. 4 and 5, or may be implemented in any other suitable manner for limiting current in a current limit mode of operation based on the IL_EN signal.

The charge pump circuitry 710 is similar to the charge pump circuitry 110 and includes the transistors M1T, M2T, M2B, and M1B and the CPUMP capacitor 204 coupled in the same manner. The charge pump circuitry 710 further includes another NMOS transistor M1BS having its source and drain terminals coupled to the source and terminals, respectively, of M1B and having a gate terminal receiving a different control signal PH1BS. M1BS has its drain and source terminals effectively coupled in parallel with M1B, but is significantly smaller or weaker than M1B, meaning that when M1BS is turned on, its drain current is significantly less than the drain current of M1B when M1B is turned on. Although not shown in FIG. 7, the charge pump controller 126 may also be included but modified to provide the PH1BS signal. When the T_EN signal is negated for the normal mode of operation, PH1BS is controlled in substantially the same manner as PH1B so that M1B and M1BS are both turned on or off at the same time. When the T_EN signal is asserted to modify timing during the current limit mode, the timing of M1BS is modified relative to M1B as further described herein.

The output portion is substantially the same as previously described. The OUT terminal of the charge pump circuitry 710 at the drain of M2T is coupled through the resistor 112, the electrical interface 114, and the conductor 116 to one end of the capacitor 118, having its other end coupled to GND. Capacitor 124 is coupled between the drain terminals of M2T and M1B, and the drain terminals of M1B and M1BS are coupled through the electrical interface 120 and the conductor 122 to GND.

Figure 8:
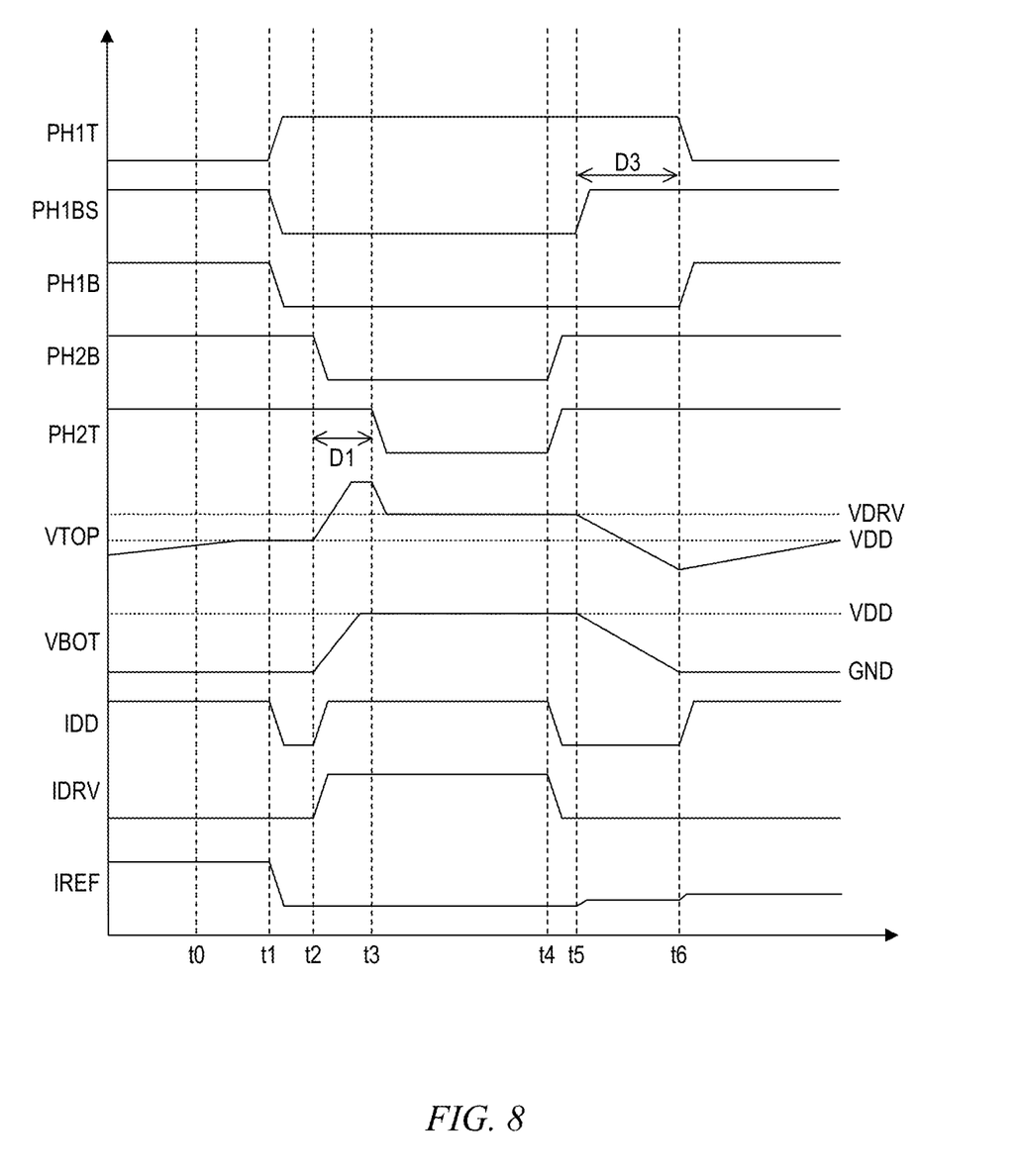
FIG. 8 is a timing diagram illustrating operation of the charge pump controller for of FIG. 1 controlling timing of the charge pump circuitry configured as shown in FIG. 7, during the current limit mode to one embodiment of the present disclosure.

FIG. 8 is a timing diagram illustrating operation of the charge pump controller 126 for controlling timing of the charge pump circuitry 710, configured as shown in FIG. 7, when the mode circuitry 128 asserts both the IL_EN and T_EN enable signals according to one embodiment of the present disclosure. The current limit circuitry 702 may be configured as shown in either FIG. 1 or FIG. 3 or any other suitable current limit configuration, but is active in any case to limit current during the current limit mode. The control signals PH1T, PH1BS, PH1B, PH2B, PH2T, the voltages VTOP and VBOT, and the currents IDD, IDRV and IREF are plotted versus time illustrating operation from a pre-charge phase to a pump phase and then back to a subsequent pre-charge phase.

The switching transition from the pre-charge phase to the pump phase is substantially similar to that of the control timing of the charge pump circuitry 110 described in FIG. 6. At a first time t0, PH1T is asserted low while PH1BS, PH1B, PH2B, and PH2T are asserted high so that M1T, M1BS, and M1B are turned on while M2B and M2T are turned off. As before, the capacitor 204 is coupled between VDD and GND so that VBOT is pulled low to GND while VTOP charges to the voltage level of VDD. The currents IDD and IREF are high for charging the pump capacitor while IDRV is low. At a subsequent time t1 after the capacitor 204 is fully charged, PH1T is pulled high while PH1B is pulled low turning off M1T and M1B to terminate the first pre-charge phase, and the currents IDD and IREF go low. After a short delay at a time t2, PH2B is pulled low turning on MB1 to begin the pump phase. The currents IDD and IDRV go high and the voltages VBOT and VTOP ramp upwards. PH2T remains high keeping M2T off for the delay period D1 as previously described. At a subsequent time t3 after the delay period D1, PH2T is pulled low to turn on M2T to deliver charge from the CPUMP capacitor 204 to the CEXT capacitor 118. VTOP falls to the voltage level of VDRV while the currents IDD and IDRV remain high.

At a subsequent time t4, PH2B and PH2T are pulled high to turn off M2B and M2T to terminate the pump phase in a similar manner as the charge pump circuitry 110. The currents IDD and IDRV go low. In this case, however, after a short delay, PH1BS is pulled high to turn on M1BS while M1T and M1B both remain off. M1BS is much weaker than M1B to further limit the current spike on IREF through LREF. The current IREF increases but to a lower level to begin pulling VBOT and VTOP low. PH1T remains high and PH1B remains low keeping both M1T and M1B off for a delay period D3. At a subsequent time t6 after the delay period D3, PH1T is pulled low and PH1B is pulled high to turn on both M1T and M1B to begin recharging capacitor 204 for the next cycle. When M1T and M1B are both turned on, the current IDD goes high and IREF increases for the pre-charge cycle, and VTOP rises back to VDD.

In a similar manner described for the delays D1 and D2, the delay D3 may also be implemented as a fixed delay period for a given configuration. D3 may be empirically determined for a given circuit configuration. For example, a simple delay function may be included. In an alternative embodiment, a voltage comparator (not shown) may be included to compare VTOP and VDD in which the charge pump controller 126 pulls PH1T low only after the comparator triggers when VTOP falls below VDD.

The present description has been presented to enable one of ordinary skill in the art to make and use the present invention as provided within the context of particular applications and corresponding requirements. The present invention is not intended, however, to be limited to the particular embodiments shown and described herein, but is to be accorded the widest scope consistent with the principles and novel features herein disclosed. Many other versions and variations are possible and contemplated. Those skilled in the art should appreciate that they can readily use the disclosed conception and specific embodiments as a basis for designing or modifying other structures for providing the same purposes of the present invention without departing from the spirit and scope of the invention.

The invention claimed is:

1. A charge pump system, comprising:
   charge pump circuitry comprising a plurality of switches and at least one capacitor, wherein the charge pump circuitry has an input coupled to a supply input node and has an output for developing a drive voltage;
   a charge pump controller that controls the plurality of switches to control coupling of the at least one capacitor to increase the drive voltage above a supply voltage provided to the supply input node; and
   current limit circuitry that allows current through the charge pump circuitry to reach a maximum current level during a normal mode, and that limits current through the charge pump circuitry to a limited current level that is less than the maximum current level during a current limit mode.

2. The charge pump system of claim 1, further comprising:
   a decoupling capacitor coupled between the output of the charge pump circuitry and a supply reference node; and
   a resistor coupled between the output of the charge pump circuitry and a drive node developing the drive voltage.

3. The charge pump system of claim 1, wherein the current limit circuitry is coupled between the supply input node and the input of the charge pump circuitry, and wherein the current limit circuitry is enabled during the current limit mode to limit current from the supply input node to the limited current level.

4. The charge pump system of claim 1, wherein the current limit circuitry is coupled to the charge pump controller, and wherein the current limit circuitry is operative during the current limit mode to limit a drive capacity of the charge pump controller.

5. The charge pump system of claim 1, wherein:
   the charge pump circuitry comprises:
      a first switch that couples a top end of the at least one capacitor to the supply input node during a pre-charge phase; and
      a second switch that couples a bottom end of the at least one capacitor to the supply input node during a pump phase;
   wherein the charge pump controller comprises:
      a first driver that controls the first switch, wherein the first driver comprises source terminals coupled between the drive voltage and a gate node; and
      a second driver that controls the second switch, wherein the second driver comprises source terminals coupled between the supply input node and the gate node; and
   wherein the current limit circuitry drives the gate node to a limit voltage level during the current limit mode so that current through the first switch is limited to the limited current level when turned on during the pre-charge phase, and so that current through the second switch is limited to the limited current level when turned on during the charge phase.

6. The charge pump system of claim 5, wherein:
   the first switch comprises a first PMOS transistor having a source terminal coupled to the supply input node, having a drain terminal coupled to the top end of the at least one capacitor, and having a gate node;
   wherein the second switch comprises a second PMOS transistor having a source terminal coupled to the supply input node, having a drain terminal coupled to the bottom end of the at least one capacitor, and having a gate node; and
   wherein the current limit circuitry comprises:
      a current limit circuit that provides limited current to a first node;
      a first NMOS transistor having a drain terminal and a gate terminal coupled to a second node, and having a source terminal coupled to a supply reference node;
      a second NMOS transistor having a drain terminal coupled to the gate node, having a source terminal coupled to the supply reference node, and having a gate terminal coupled to a third node;
      a third PMOS transistor having a source terminal coupled to the supply input node, having a drain terminal coupled to the gate node, and having a gate terminal coupled to a fourth node; and
      mode circuitry that couples the first, second, and third nodes together and that couples the fourth node to the gate node during the current limit mode, and that isolates the first and second nodes and couples the third and fourth nodes together to the supply input node during the normal mode.

7. The charge pump system of claim 1, wherein:
   the charge pump circuitry comprises:
      a first switch having current terminals coupled between the supply input node and a top node;
      a second switch having current terminals coupled between a bottom node and a supply reference node;
      a third switch having current terminals coupled between the supply input node and the bottom node;
      a fourth switch having current terminals coupled between the top node and an output node;

wherein the at least one capacitor comprises a pump capacitor coupled between the top and bottom nodes; and wherein, during the current limit mode, the charge pump controller turns on the first and second switches and turns off the third and fourth switches during a pre-charge phase, and then turns off the first and second switches to start a pump phase, and then turns on the third switch after turning off the first and second switches during the pump phase, and lastly turns on the fourth switch after a first delay period during the pump phase.

8. The charge pump system of claim 7, wherein, during the current limit mode, the charge pump controller further turns off the third and fourth switches to terminate the pump phase, and then turns on the second switch after turning off the third and fourth switches, and lastly turns on the first switch after a second delay period to begin a next pre-charge phase.

9. The charge pump system of claim 8, wherein the first delay period is sufficiently long to ensure that a voltage level of the top node is above a voltage level of the output node, and wherein the second delay period is sufficiently long to ensure that a voltage level of the top node is less than a voltage level of the supply input node.

10. The charge pump system of claim 7, further comprising:
the charge pump circuitry including a fifth switch having current terminals coupled between the bottom node and the supply reference node; and
wherein, during the current limit mode, the charge pump driver turns off the fifth switch during the pump phase, and wherein the charge pump driver further turns off the third and fourth switches to terminate the pump phase, and then turns on the fifth switch after turning off the third and fourth switches, and lastly turns on the first and second switches after a second delay to begin a next pre-charge phase.

11. The charge pump system of claim 7, further comprising:
a decoupling capacitor coupled between the output node and the supply reference node; and
a resistor coupled between the output node and a drive node developing the drive voltage.

12. A method of operating a charge pump system, comprising:
controlling charge pump circuitry comprising a plurality of switches and at least one capacitor to drive a voltage level of a drive voltage developed on a drive node above a voltage level of a supply voltage provided to an input of the charge pump circuitry; and
allowing current through the charge pump circuitry to reach a maximum current level during a normal mode, and limiting current through the charge pump circuitry to a limited current level that is less than the maximum current level during a current limit mode.

13. The method of claim 12, further comprising:
providing current limit circuitry between the supply voltage and the input of the charge pump circuitry;
wherein the allowing current comprises bypassing the current limit circuitry during the normal mode; and
wherein the limiting current comprises selecting the current limit circuitry during the current limit mode to limit current from the supply voltage to the input of the charge pump circuitry to the limited current level during the current limit mode.

14. The method of claim 12, further comprising:
providing a first switch that couples a top end of the at least one capacitor to a supply input node receiving the supply voltage during a pre-charge phase;
providing a second switch that couples a bottom end of the at least one capacitor to the supply input node during a pump phase; and
wherein the limiting current during the normal mode comprises controlling the first and second switches to limit current through the first and second switches to the limited current level when turned on.

15. The method of claim 14, further comprising:
providing a charge pump controller comprising drive circuitry that controls the first and second switches during the pre-charge and pump phases;
providing current mirror circuitry coupled to the charge pump controller; and
wherein the limiting current during the normal mode comprises enabling the current mirror circuitry to limit a drive capacity of the drive circuitry.

16. The method of claim 14, further comprising:
providing a charge pump controller comprising drive circuitry that controls the first and second switches during the pre-charge and pump phases;
providing current mirror circuitry coupled to the charge pump controller; and
wherein the limiting current during the normal mode comprises coupling the first switch in parallel with a current limited device within the current mirror circuitry to limit current through the first switch when turned on, and coupling the second switch in parallel with the current limited device to limit current through the second switch when turned on.

17. The method of claim 12, further comprising:
providing a first switch having current terminals coupled between a top node and a supply input node receiving the supply voltage;
providing a second switch having current terminals coupled between a bottom node and a supply reference node;
providing a third switch having current terminals coupled between the supply input node and the bottom node;
providing a fourth switch having current terminals coupled between the top node and the drive node;
providing a pump capacitor coupled between the top and bottom nodes; and
during the current limit mode:
turning on the first and second switches and turning off the third and fourth switches during a pre-charge phase;
turning off the first and second switches to terminate the pre-charge phase and start a pump phase;
turning on the third switch after turning off the first and second switches during the pump phase; and
turning on the fourth switch after a first delay period during the pump phase.

18. The method of claim 17, further comprising:
during the current limit mode:
turning off the third and fourth switches to terminate the pump phase;
turning on the second switch after turning off the third and fourth switches; and
turning on the first switch after a second delay period to begin a next pre-charge phase.

19. The method of claim 18, wherein the turning on the fourth switch after a first delay period comprises turning on the fourth switch after a sufficiently long period to ensure that a voltage level of the top node is above a voltage level of the output node, and wherein the turning on the first switch after a second delay period comprises turning on the first switch after a sufficiently long period to ensure that a voltage level of the top node is less than a voltage level of the supply input node.

20. The method of claim 17, further comprising:
providing a fifth switch having current terminals coupled between the bottom node and the supply reference node; and
during the current limit mode:
- turning off the fifth switch during the pump phase;
- turning off the third and fourth switches to terminate the pump phase;
- turning on the fifth switch after turning off the third and fourth switches; and
- turning on the first and second switches after a second delay sufficiently long to ensure that a voltage level of the top node is less than a voltage level of the supply input node to begin a next pre-charge phase.

* * * * *